(12) United States Patent
Chen

(10) Patent No.: US 6,212,484 B1
(45) Date of Patent: Apr. 3, 2001

(54) INSTANCE-BASED MIRRORING METHOD IN FEATURE MODELING

(75) Inventor: Jingyang Chen, Novi, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/149,361

(22) Filed: Sep. 8, 1998

(51) Int. Cl.⁷ ................................................. G06F 17/16
(52) U.S. Cl. ........................ 703/2; 700/98; 345/433
(58) Field of Search ............................. 703/22, 98, 2, 703/3; 345/112, 419, 427, 433, 133; 700/98; 702/167

(56) References Cited

U.S. PATENT DOCUMENTS

| | | | | |
|---|---|---|---|---|
| 4,126,386 | * | 11/1978 | Fritzler | 352/105 |
| 4,701,752 | * | 10/1987 | Wang | 345/121 |
| 5,854,632 | * | 12/1998 | Steiner | 345/426 |
| 5,996,132 | * | 12/1999 | Sorimachi | 4/236 |
| 6,011,566 | * | 1/2000 | Salamon | 345/517 |
| 6,120,171 | * | 9/2000 | Shaikh | 364/468.04 |

OTHER PUBLICATIONS

Mifsumoto, Tamura Okasaki Kajimi and Fukui, '3–D Reconstruction Using Mirror Images Based on a P{lane Symmetry Recovering Method', Nov. 16, 1989, IEEE0162–8828/92 pp. 941–946.*

Zhang and Tsui, '3D Reconstruction from a Single View of an Object and Its Image in a Plane Mirror', 1998, IEEE 1051–4651/98 pp. 1174–1176.*

* cited by examiner

*Primary Examiner*—Kevin J. Teska
*Assistant Examiner*—Lonnie A. Knox
(74) *Attorney, Agent, or Firm*—Gates & Cooper LLP (57) ABSTRACT

A method, apparatus and article of manufacture for mirroring a part model within a computer aided design computer system. A physical body, which is not directly accessible to the user is used for boundary representation of the non-mirrored part model, and a special mirror transformed instance of the physical body, called the logical body, is presented to the user. The logical body is a mirrored boundary representations of the same part model, and is not persistent to conserve computer resources. The invention uses face, edge, and vertex mapping to communicate between the two bodies, and uses matrix multiplication to perform the mirroring transformation.

33 Claims, 7 Drawing Sheets

INSTANCE-BASED MIRRORING METHOD IN FEATURE MODELING

BACKGROUND OF THE INVENTION

1. Field of the Invention

This invention relates in general to feature based three-dimensional (3D) computer aided design (CAD) systems, and more particularly, to a method, apparatus and article of manufacture for instance based mirroring in feature modeling.

2. Description of Related Art

Figure 1A:
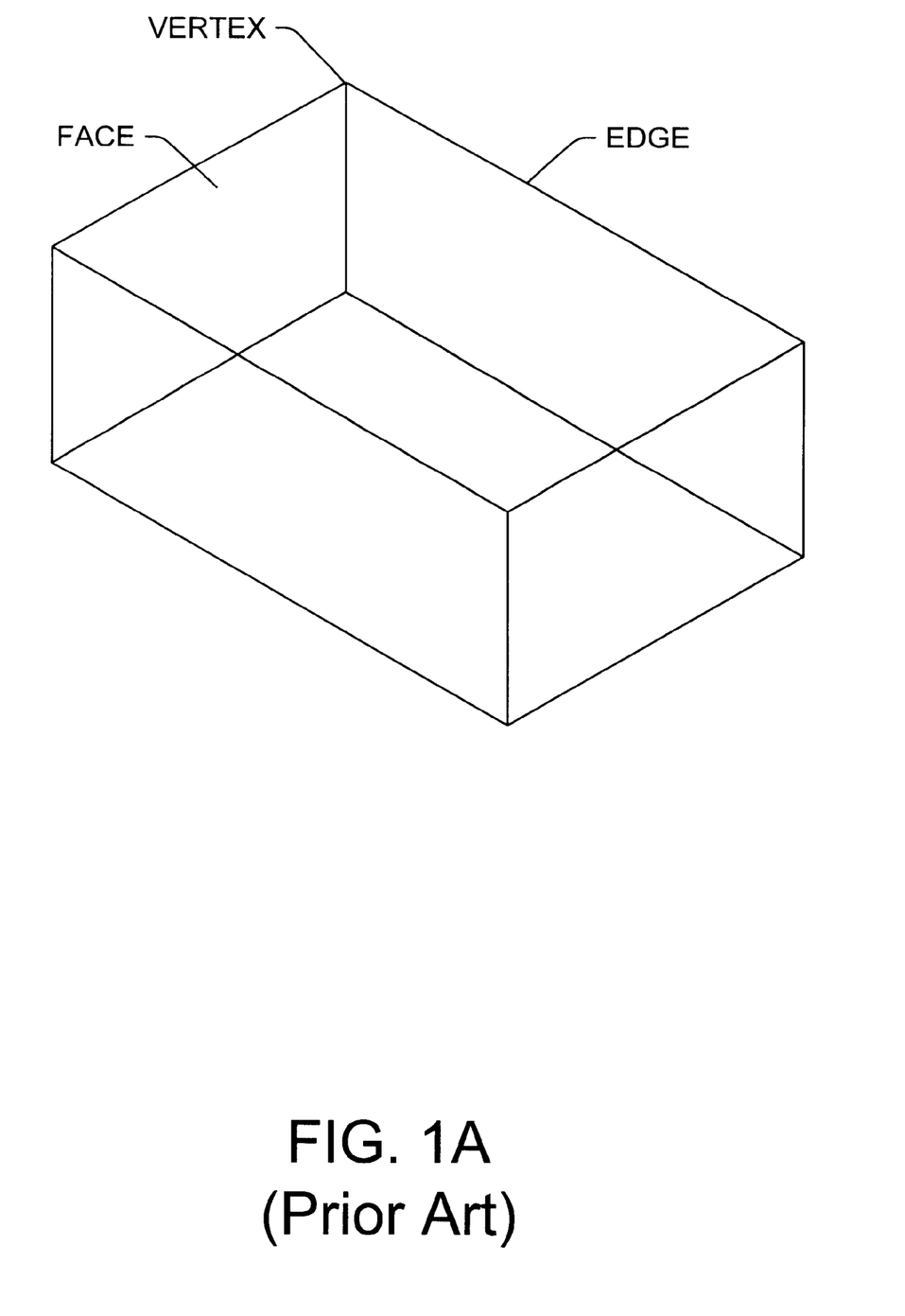
FIG. 1A illustrates boundary representations of the prior art.

Traditional mechanical CAD systems model mechanical parts using boundary representations. Typical boundary representations use BODY, FACE, EDGE, and VERTEX to describe mechanical parts. For example, the part model in FIG. 1A has one body, six faces, twelve edges, and eight vertices.

Figure 1B:
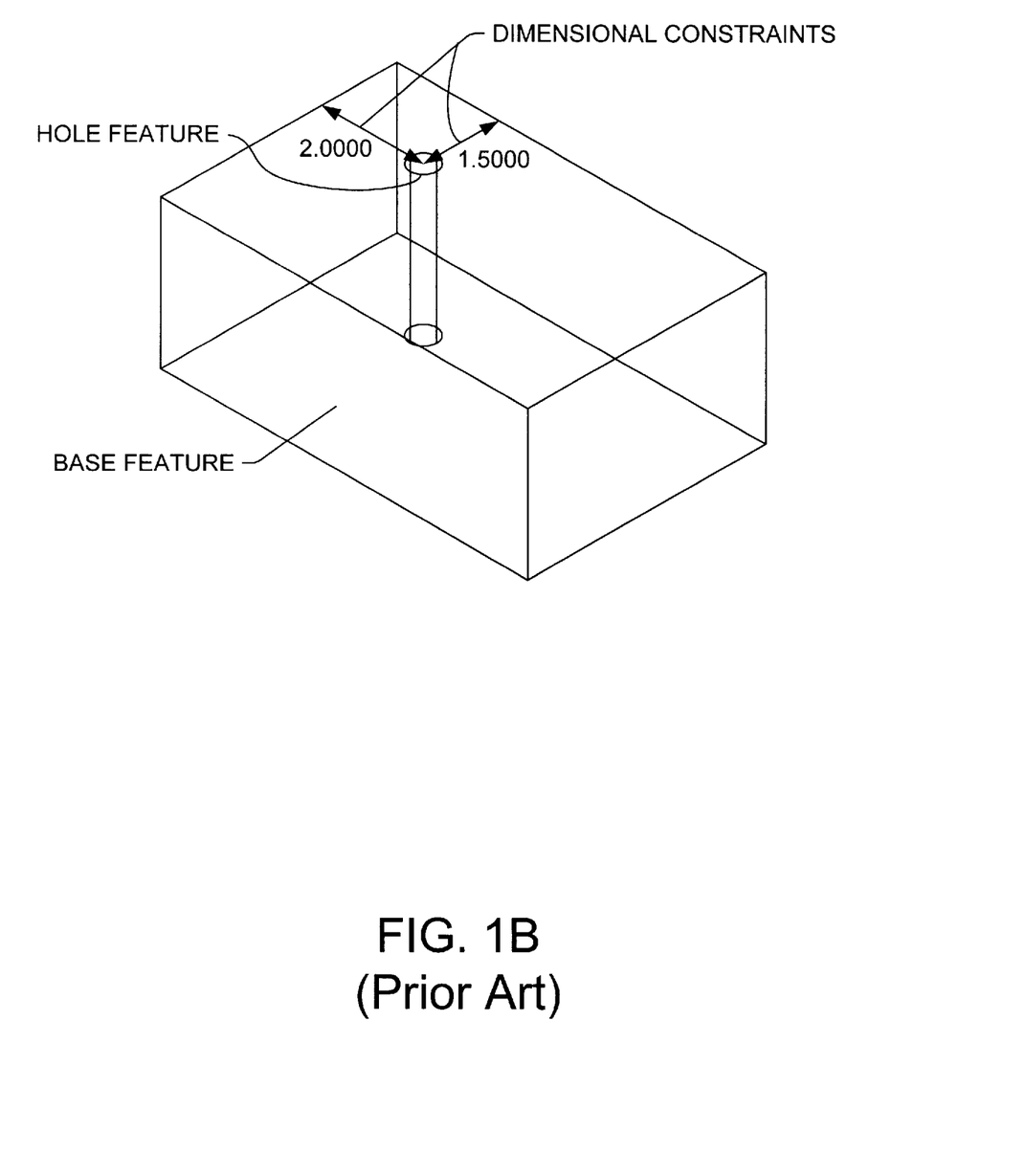
FIG. 1B illustrates part features and constraints of the prior art.

Feature based CAD systems add feature recipes on top of boundary representations. A feature recipe comprises feature definitions, dependency identifications, and constraints. For example, the part model in FIG. 1B has one "base" feature and one "hole" feature which is constrained to two edges of the base feature by two dimensional constraints.

Dependency identification is an important part of the feature recipe. Dependency identification is used to identify geometric entities of the boundary representation on which the features depend. For example, the HOLE feature in FIG. 1B depends on the two edges that must be identified by the dependency identification information. Part of the dependency identification information must be stored with the boundary representation. This makes the boundary representation in feature based CAD systems different from that of traditional CAD systems.

Mechanical assemblies often contain pairs of parts that are symmetric to a plane. Instead of modeling both symmetric parts, CAD system users prefer to model only one half of the pair, and then perform a mirror transformation to obtain the symmetric counterpart, e.g., the mirrored part model.

In feature-based solid modeling, a mirrored part model should contain all of the original features in a mirrored form, and maintain the validity of the original feature recipe. A mirrored part model should behave the same as a non-mirrored part model in terms of modeling activities such as feature creation, alteration, and deletion.

Current mirroring require processing of feature recipes. Current mirror methods mirror the feature recipe itself, which requires programming a mirror method for each type feature of the CAD system, such as the EXTRUSION feature, the HOLE feature, etc. This approach is limited because of the amount of time required to write the programming, and further limited because new features will not have mirror methods without additional programming time for new releases of the CAD system.

Further, the mirror process of dependency identifications pose an even bigger problem for current mirroring methods. Without valid dependency identifications, a feature recipe would be useless. For example, the HOLE feature in FIG. 2 may be located incorrectly if the two edges (dependency identifications) are incorrectly mirrored. As a result, each type of dependency identifications in the feature recipe also needs dedicated programs for their mirror process.

As such, current mirroring processes are often complicated, time-consuming, error prone, and wasteful of computer resources.

It can be seen, then, that there is a need in the art for a mirroring method that avoids processing of feature equations. It can also be seen that there is a need in the art for a mirroring method that reduces the use of computer resources.

SUMMARY OF THE INVENTION

To overcome the limitations in the prior art described above, and to overcome other limitations that will become apparent upon reading and understanding the present specification, the present invention discloses a method, apparatus and article of manufacture for mirroring a part with a computer by creating a physical body and a logical body (a mirror transformed instance of the physical body), which are two individual boundary representations of the same part model, capable of supporting all the modeling needs.

The general object of the present invention is to come up with a useful method for mirroring a part without mirroring the feature recipe for the part. One specific object of the invention is to provide a method for mirroring a part that reduces the use of computer resources. Another specific object of the present invention is to provide a method for mirroring a part that is cycle complete.

The mirroring tool of the present invention does not mirror the feature recipe. Instead, the mirroring tool of the present invention mirrors the final boundary representation of the part. To achieve this, the concepts of physical body and logical body are used.

DETAILED DESCRIPTION OF THE PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-aided design (CAD) software program that performs a mirroring function on a part within a CAD drawing. The present invention utilizes the concepts of a physical body and a logical body for the mirroring process, where both bodies are a collection of boundary representations of the part to be modeled, with the logical body being a mirror transformed instance of the physical body.

The present invention operates by having the computer generate the physical body, which comprises the non-mirrored boundary representations of the part to be modeled. Once the physical body is complete, the present invention makes a copy of it, and performs a mirror transformation on the copy to create the logical body. The logical body is then used to create the image of the part on the display of the computer.

The present invention makes it unnecessary to mirror process the feature recipes, including the feature definitions, dependency identifications, and other qualities, thereby saving computer resources and computing time.

To accomplish the mirror transformation from the physical body to the logical body, the present invention uses a special transformation matrix, and uses a bit flag to indicate if the part has been mirrored or not. Further, the mirroring tool of the present invention is cycle complete; in other words, if a user mirrors a part model, and then mirrors the mirrored part model again, the user will return to the original non-mirrored part exactly. On the other hand, if the feature recipe has been mirror processed, it is highly unlikely another mirror would restore it to the original non-mirrored state.

Hardware Environment

Figure 1C:
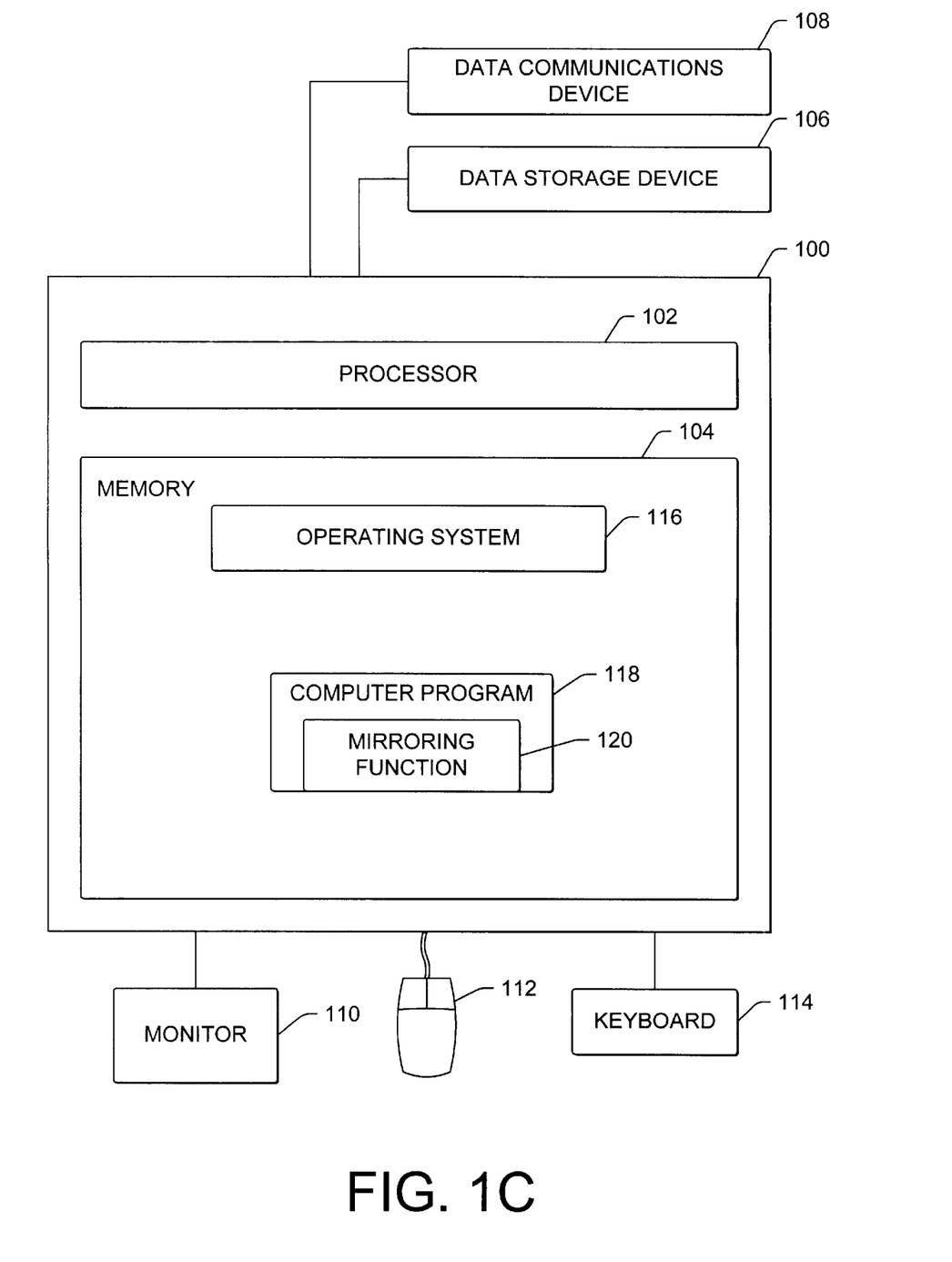
FIG. 1C illustrates an exemplary computer hardware environment that could be used with the present invention.

FIG. 1C is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Any combination of the above components, or any number of different components, peripherals, and other devices, may be used with the computer 100 without departing from the scope of the present invention.

The personal computer 100 usually operates under the control of an operating system 116. The present invention is usually implemented in one or more computer programs 118 that operate under the control of the operating system 116. The computer program 118 is usually a CAD program or other graphics program. In the preferred embodiment, the computer program 118 provides one or more mirroring functions 120.

Generally, the computer program 118 and mirroring function 120 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Many modifications may be made to this configuration without departing from the scope of the present invention.

The present invention also teaches that any combination of the above components, or any number of different components, including computer programs, peripherals, and other devices, may be used to implement the present invention, so long as similar functions are performed thereby. The presentation of the computer system as described in FIG. 1 is not meant to limit the scope of the present invention, but to illustrate one possible embodiment of the present invention.

Computer Generation of a Part

Figure 2:
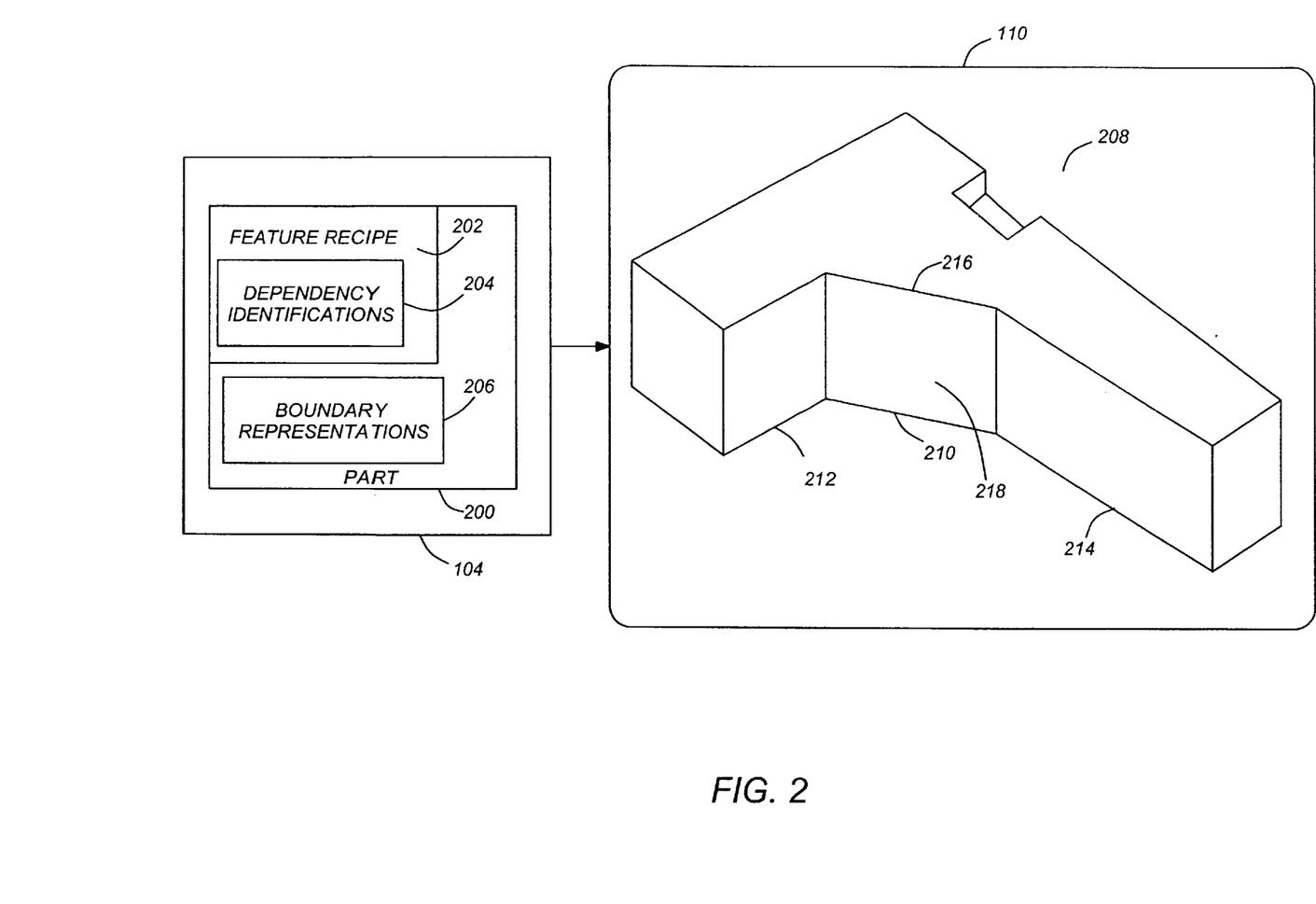
FIG. 2 illustrates the method for displaying a part on a computer display device.

FIG. 2 illustrates the method for displaying a part on a computer display device. The memory 104 stores a number of items associated with part 200, called features 202 of part 200.

Feature recipe 202 is a component of the part 200, and is unique to each part 200 stored in the memory 104. Each part has a feature recipe 202 to dictate the appearance of the part 200 on the monitor 110.

The appearance of the part 200 is represented by the boundary representation 206. Boundary representation 206 is generated by processor 106 based on the feature recipe 202, and is typically composed of a number of faces and edges. Once generated, the faces and edges are drawn on the monitor 110 as the illustration 208. The user manipulates the feature recipe 202 through the illustration 208 for modeling activities. For example, when the user is to add a HOLE feature to the part 200, the user must specify a face 218 on which the hole is to reside, and two edges 210–216 to which the hole is to be constrained.

To create a mirror image of part 200 (in reality, a mirror image of illustration 208), the user applies a mirroring function 120 to part 200. The mirroring function 120 would then mirror the feature recipe 202, including feature definitions and dependency identifications. This approach creates problems in terms of computing time and computing errors.

The present invention introduces a new mirroring function 120 to create a mirror image of illustration 208 by mirroring only the boundary representation 206 of part 200. To do this, an additional boundary representation 206 of part 200 must be created and stored separately from the original boundary representation 206.

The original boundary representation 206 is called the physical body, and the additional boundary representation called the logical body.

Figure 3:
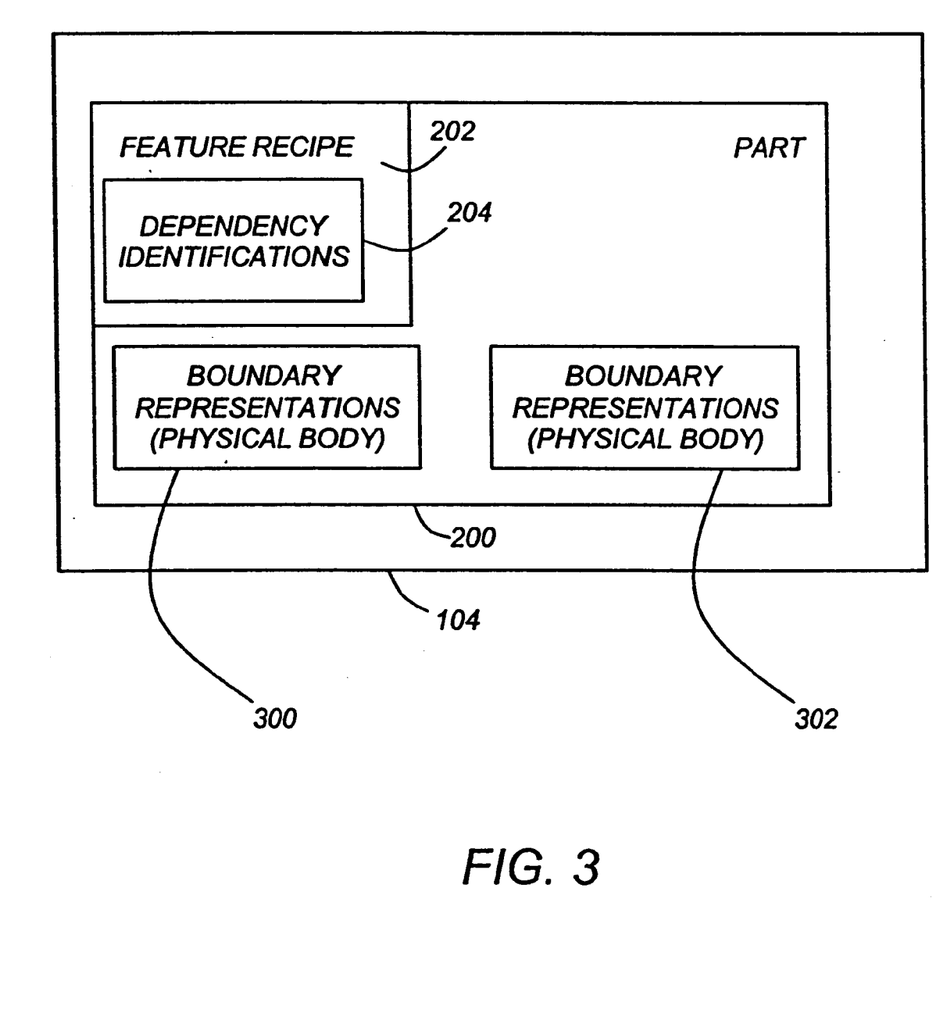
FIG. 3 illustrates the relationship between the physical body and the logical body of the present invention.

FIG. 3 illustrates the relationship between the physical body and the logical body.

Physical body 300 of part 200 is the original boundary representation of part 200. Physical body 300 is generated by processor 106 based on feature recipe 202, and carries all the information necessary for supporting the dependency identification 204.

In contrast, logical body 302 contains only the boundary representations of part 200. Logical body 302 does not carry the information necessary for supporting the dependency identification 204. There can be no more than one logical body 302 associated with physical body 300.

Logical body 302 is a mirror transformed instance of physical body 300. Once created, the logical body 302 is used by computer 100 to generate the lines and curves to be displayed on monitor 110.

Figure 4:
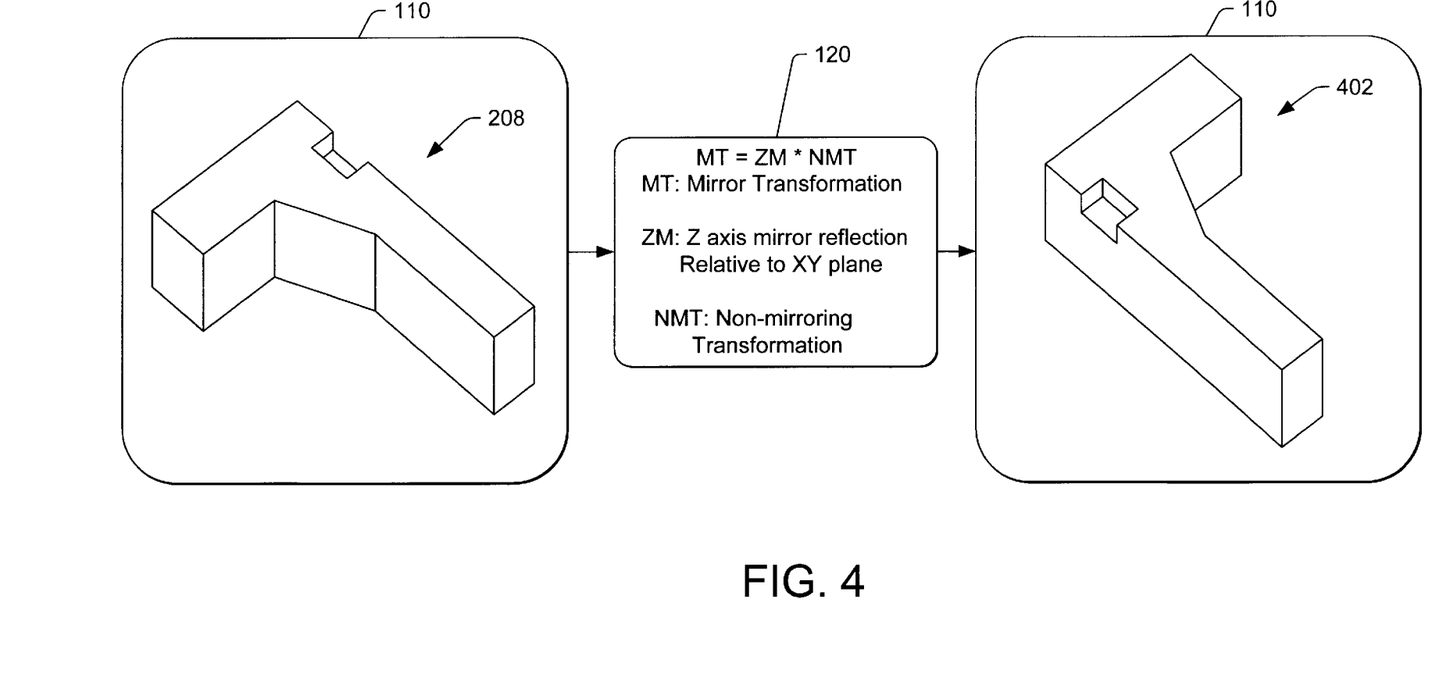
FIG. 4 illustrates the mirroring function of the present invention.

FIG. 4 illustrates the operation of the mirroring function 120 according to the present invention. Illustration 208 is shown on monitor 110. Mirroring function 120 is used to create a mirror image illustration 402 of illustration 208.

The mirror transformation between the logical and the physical body is represented by a transformation matrix. To conserve computer 100 resources and avoid using memory 104 to save the mirror transformation matrix, the present invention standardizes the mirror transformation to a reflection relative to the XY plane (defined as a matrix that converts z to −z). This mirror transformation is defined as ZM. Any user provided mirror transformation MT can then be decomposed by the present invention into $$MT=ZM*NMT$$

where NMT=ZM*MT is a non-mirror transformation.

The NMT matrix is applied to the physical body 300. An instance of the (non-mirror) transformed physical body 300 is drawn to make the logical body, which is then transformed by ZM. Again, ZM (the standardized mirror transformation) is only applied to the logical body 300.

In order to support the dependency identification 204, there is a need to map each geometric entity (face, edge, vertex) on the logical body with their counter parts on the physical body, and vise versa. The mapping relationship is described by the following equation:

$$LOGICAL\_ENTITY=PHYSICAL\_ENTITY*ZM$$

where ZM is the z to z mirror transformation.

The selection of ZM is somewhat arbitrary. Alternative mirror transformation such as x to x and y to y can also be used to achieve the same results.

The physical entity 300 and the logical entity 302 can always be mapped into each other using the above geometric relationship. However, using geometrical constructs uses large amounts of computer 100 resources. To avoid this, the present invention uses face and edge mapping to map the physical body 300 into the logical body 302 (and vice versa if necessary).

Face mapping maps each face of the physical body 300 into a face of the logical body 302. This is done by indexing the faces (1, 2, . . . ,i) and mapping the $i^{th}$ face on the physical body 300 into the $i^{th}$ face on the logical body 302. This makes the face mapping robust and inexpensive.

Unlike face mapping, edge mapping cannot be accomplished by index only, because the edge sequence is altered by the mirror transformation. However, after the face mapping is complete, the edge mapping can be accomplished using the face mapping results. To do this, the present invention first maps two adjacent faces of the source edge of the physical body 300 to get two faces on the logical body 302, and then finds all the edges between these two faces. If there is only one edge, which should be the majority case, the result is mapped. Otherwise the middle point of the candidate edges is checked to find the best fit. The only assumption used to complete the edge mapping is that the physical body 300 is manifold.

Similarly, vertex mapping can be accomplished through edge mapping. To map a vertex, the present invention first maps one of its adjacent edges, which would limit the potential candidate to two points (the two end points of the edge), among which the best fit is mapped.

Mirroring function 120 uses a bit flag within the definition of part 200 to indicate if the part is mirrored. Further, mirroring function uses a pointer to relate the logical body to the physical body.

In order to save computer resources, logical body 302 is not stored on the Data Storage Device 106. Instead, a bit flag is stored within the part 200 to indicate if the part is mirrored. Upon retrieving part 200 from the Data Storage Device 106, the logical body is reconstructed if the bit flag is set.

By using the pointer and the bit flag, the history log of part 200 remains with the physical body, and any operations done to the logical body remain as read-only operations. Further, dependency identifications remain defined within the physical body, and topological or geometrical entities therefore remain with the physical body. The mirroring function 120 of the present invention adds an optional argument to the targeting methodology of the dependent identifications to allow for optional conversion of the topological and geometrical entities to their counter parts on the logical body. The default for the argument can be set such that external applications will still use the physical body for topological or geometrical entities, and the argument can selectively be changed from the default to use the logical body for the source of the topological and geometrical entities.

Logic of the Mirroring Function

Figure 5:
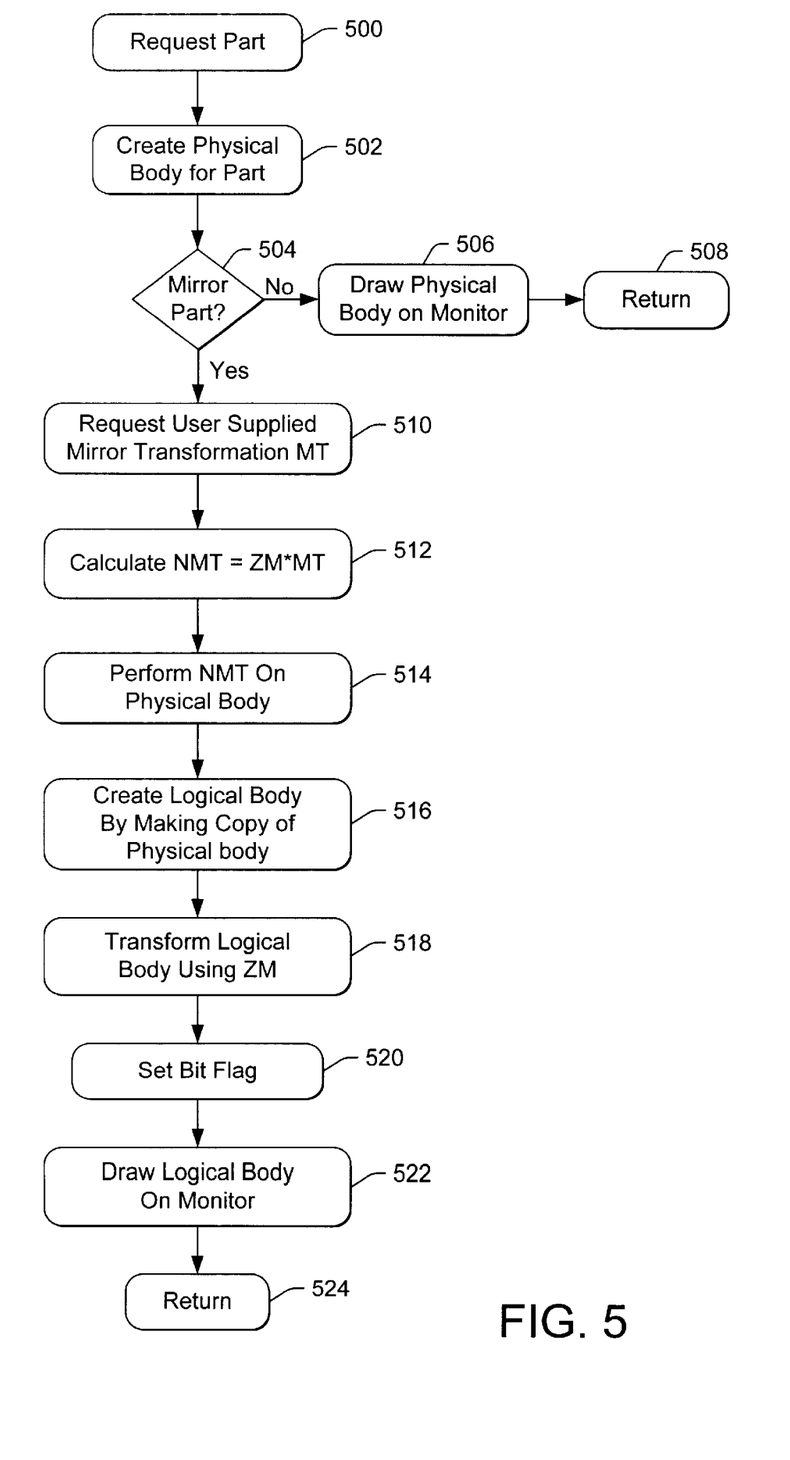
FIG. 5 is a flowchart that illustrates the logic of the mirroring function of the present invention.

A flowchart which illustrates the logic of the mirroring function 120 of the present invention is shown in FIG. 5. This logic is provided for illustrative purposes only and that different logic may be used to accomplish the same results without departing from the scope of the present invention. The use of the mirroring function 120 with different computer programs 118 may result in different operations (or potentially the same operations).

Block 500 represents the computer 100 selecting or requesting a part 200 to be displayed on the monitor 110 of the computer 100. Block 502 represents the computer 100 creating a physical body 300 for the part 200. Block 504 is a decision block that represents the computer 100 requesting that the part 200 be mirrored. If there is no mirroring selection, control passes to block 506 where the computer program 118 draws or displays the part 200 on the monitor 110, and then passes control to 508, where control is returned to computer program 118.

If there was a mirroring selection in decision block 504, control passes to block 510, which requests the user to provide a mirroring transformation represented by a matrix MT. The control then passes to block 512, which calculates a non-mirror transformation matrix NMT based on the given equation. The control then passes to 514, which performs the non-mirror transformation on the physical body using the NMT matrix. The control then passes to block 516, which creates the logical body by making a copy of the physical body (which is already transformed by NMT). The control then passes to block 518, which transforms the logical body using the standardized matrix ZM. The control next passes to block 520, which set the bit flag to indicate that the part is mirrored. After the bit flag is set, the logical body 302 is drawn on the monitor at control block 522. The control then passes to block 524, where control is returned to computer program 118.

General Considerations

Other considerations and concerns are also addressed by the present invention. For example, if a mirrored part 200 is mirrored again by mirroring function 120, part 200 returns to being a non-mirrored part. The bit flag is set to indicate that the part 200 is not mirrored and the physical body 300 pointer is set to be equal to the logical body 302 pointer. The original physical body 300 is still transformed by some non-mirroring transformation so that it will appear to be mirrored relative to the original logical body 302, which was mirrored.

The method of the present invention is cycle complete, meaning that if a non-mirrored part is mirrored twice, the original non-mirrored part is returned exactly. The cycle complete quality of the present invention reduces the risk of mirroring operations, because if feature creation/edition is not supported on the mirrored part 200, the part 200 can be mirrored back to the original non-mirrored part 200, feature creation/edition can be performed, and then part 200 can be mirrored again. The feature creation and edition on mirrored parts is achieved through "edit in place" techniques.

Conclusion

This concludes the description of the preferred embodiment of the invention. In summary, the present invention discloses a method, apparatus and article of manufacture for mirroring an object in a computer-generated image. A physical body and a logical body for the object are created in the computer, wherein the logical body is a mirror transformed instance of the physical body. Only the logical body is displayed on a display device of the computer.

The following describe some alternative ways of accomplishing the present invention. For example, different computer programs, operating environments, and operating systems could be substituted for those described herein without departing from the scope of the present invention. In addition, the present invention could be used any type of computer, and need not be limited to a personal computer. The present invention could also be used with any type of graphics system, and need not be limited to the example described herein. Alternate approaches could also be substituted for the logic described herein without departing from the scope of the present invention.

In conclusion, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of mirroring an object in a computer-generated image, comprising:
   (a) creating a first boundary representation for a feature based modeling object in a computer, wherein the first boundary representation comprises a physical body for the object;
   (b) creating a second boundary representation for the object in the computer, the second boundary representation comprises a logical body for the object, the second boundary representation being a non-mirror transformed instance of the physical body;
   (c) transforming the second boundary representation into a mirrored boundary representation; and
   (d) displaying the mirrored boundary representation on a display device of the computer.

2. The method of claim 1, further comprising setting a flag within the object indicating whether the object is mirrored.

3. The method of claim 1, wherein the transforming comprises mapping at least one face of the physical body into at least one face of the logical body.

4. The method of claim 1, wherein the transforming comprises mapping at least one edge of the physical body into at least one edge of the logical body.

5. The method of claim 1, wherein the transforming comprises mapping at least one vertex of the physical body into at least one vertex of the logical body.

6. The method of claim 1, wherein the transforming comprises transforming positive z-axis values of the logical body to negative z-axis values of the mirrored logical body.

7. The method of claim 6, wherein the transforming positive z-axis values of the logical body to negative z-axis values of the mirrored logical body is performed by a first matrix.

8. The method of claim 7, wherein the creating comprises:
   creating a copy of the first boundary representation; and
   performing a non-mirroring transformation on the copy of the first boundary representation.

9. The method of claim 7, wherein the performing the non-mirroring transformation is performed by a second matrix.

10. The method of claim 1, wherein the transforming comprises transforming positive x-axis values of the logical body to negative x-axis values of the mirrored logical body.

11. The method of claim 1, wherein the transforming comprises transforming positive yaxis values of the logical body to negative y-axis values of the mirrored logical body.

12. An apparatus for generating a mirrored part with a computer, the apparatus comprising:
   (a) a computer, comprising a processor, a memory, and a display device;
   (b) means, performed by the computer, for creating a first boundary representation and a second boundary representation for a feature based modeling object in the computer, wherein the first boundary representation comprises the physical body and the second boundary representation comprises the logical body, the second boundary representation being a non-mirror transformed instance of the physical body;
   (d) means, performed by the computer, for transforming the second boundary representation into a mirrored boundary representation of the object; and
   (e) means, performed by the computer, for displaying the mirrored logical body on the display device of the computer.

13. The apparatus of claim 12, further comprising, means, performed by the computer, for setting a flag within the object indicating whether the object is mirrored.

14. The apparatus of claim 12, wherein the means for transforming comprises means for mapping at least one face of the physical body into at least one face of the logical body.

15. The apparatus of claim 12, wherein the means for transforming comprises means for mapping at least one edge of the physical body into at least one edge of the logical body.

16. The apparatus of claim 12, wherein the means for transforming comprises means for mapping at least one vertex of the physical body into at least one vertex of the logical body.

17. The apparatus of claim 12, wherein the means for transforming comprises means for transforming positive z-axis values of the logical body to negative z-axis values of the mirrored logical body.

18. The apparatus of claim 17, wherein the means for transforming positive z-axis values of the logical body to negative z-axis values of the mirrored logical body is performed by a first matrix.

19. The apparatus of claim 18, wherein the means for creating further comprises:
   means for creating a copy of the first boundary representation; and
   means for performing a non-mirroring transformation on the copy of the first boundary representation.

20. The apparatus of claim 18, wherein the means for performing the non-mirroring transformation is performed by a second matrix.

21. The apparatus of claim 12, wherein the means for transforming comprises means for transforming positive x-axis values of the logical body to negative x-axis values of the mirrored logical body.

22. The apparatus of claim 12, wherein the means for transforming comprises means for transforming positive y-axis values of the logical body to negative y-axis values of the mirrored logical body.

23. A program storage device, readable by a computer having a processor, display device, data input device, and a memory, tangibly embodying one or more programs of instructions executable by the computer to perform a method for mirroring a part with a computer, the method comprising:

(a) creating a first boundary representation for a feature based modeling object in a computer, wherein the first boundary representation comprises a physical body for the object;

(b) creating a second boundary representation for the object in the computer, the second boundary representation comprises a logical body for the object, the second boundary representation being a non-mirror transformed instance of the physical body;

(c) transforming the second boundary representation into a mirrored boundary representation; and (d) displaying the mirrored boundary representation on a display device of the computer.

24. The program storage device of claim 23, the method further comprising setting a flag within the object indicating whether the object is mirrored.

25. The program storage device of claim 23, wherein the transforming comprises mapping at least one face of the physical body into at least one face of the logical body.

26. The program storage device of claim 23, wherein the transforming comprises mapping at least one edge of the physical body into at least one edge of the logical body.

27. The program storage device of claim 23, wherein the transforming comprises mapping at least one vertex of the physical body into at least one vertex of the logical body.

28. The program storage device of claim 23, wherein the transforming comprises transforming positive z-axis values of the logical body to negative z-axis values of the mirrored logical body.

29. The program storage device of claim 28, wherein the transforming positive z-axis values of the logical body to negative z-axis values of the mirrored logical body is performed by a first matrix.

30. The program storage device of claim 29, wherein the creating further comprises:

creating a copy of the first boundary representation; and performing a non-mirroring transformation on the copy of the first boundary representation.

31. The program storage device of claim 29, wherein the performing the non-mirroring transformation is performed by a second matrix.

32. The program storage device of claim 23, wherein the transforming comprises transforming positive x-axis values of the logical body to negative x-axis values of the mirrored logical body.

33. The program storage device of claim 23, wherein the transforming comprises transforming positive y-axis values of the logical body to negative y-axis values of the mirrored logical body.

* * * * *

UNITED STATES PATENT AND TRADEMARK OFFICE
CERTIFICATE OF CORRECTION

PATENT NO. : 6,212,484 B1
DATED : April 3, 2001
INVENTOR(S) : Jingyang Chen

It is certified that error appears in the above-identified patent and that said Letters Patent is hereby corrected as shown below:

Title page,
Item [56], References Cited, OTHER PUBLICATIONS, "Mifsumoto" should read -- Mitsumoto --, "P{lane" should read -- Plane --.

Column 4,
Line 42, insert "is" before "called".

Column 5,
Line 21, "z to z" should read -- z to -z --.
Line 23, "x to x and y to y" should read -- x to -x and y to -y --.

Signed and Sealed this

Twenty-third Day of July, 2002

Attest:

JAMES E. ROGAN
Attesting Officer       Director of the United States Patent and Trademark Office